CLARKE & UTTER.
Evaporating Pan.

No. 35,081.

Patented Apr. 29, 1862.

Witnesses:
J. Snowden Bell
Joe V. Meigs

Inventor:
Orlando Clark
Isaac Utter
by their Attorney
Wm. D. Baldwin

UNITED STATES PATENT OFFICE.

ORLANDO CLARKE AND ISAAC UTTER, OF ROCKFORD, ILLINOIS.

IMPROVED EVAPORATOR FOR SACCHARINE JUICES.

Specification forming part of Letters Patent No. 35,081, dated April 29, 1862.

*To all whom it may concern:*

Be it known that we, ORLANDO CLARKE and ISAAC UTTER, both of Rockford, in the county of Winnebago and State of Illinois, have invented certain new and useful Improvements in Evaporators for Saccharine Juices, of which the following is a full, clear, and exact description, reference being had to the accompanying drawings, which make part of this specification, and in which—

Figure 1:
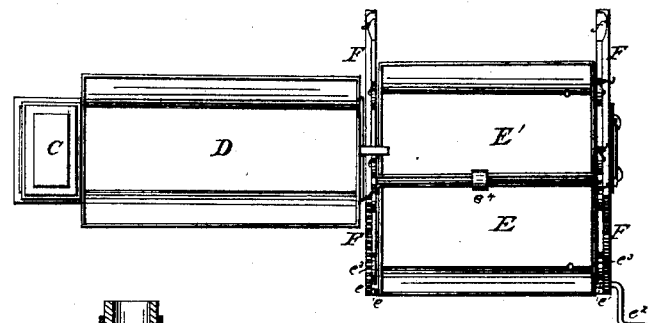
Figure 2:
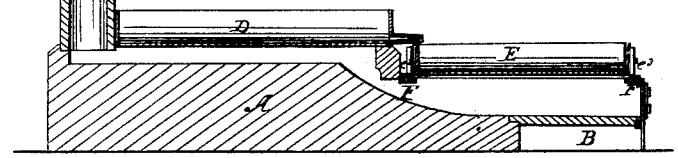
Figure 3:
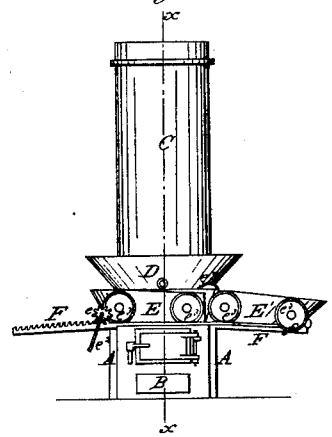

Figure 1 represents a plan or top view of an apparatus for evaporating saccharine juices, to which our improvements are applied. Fig. 2 represents a vertical longitudinal section of the same at the line $x\ x$ of Fig. 3, and Fig. 3 represents a view on elevation of the same as seen from the front.

Our invention is more particularly adapted to the evaporation of the juice of the Chinese sugar-cane, now so extensively cultivated in some parts of the country; and our improvements consist in certain novel devices, hereinafter described, for accomplishing this object in an economical, simple, effective, and expeditious manner.

In the accompanying drawings, which represent a convenient arrangement of parts for carrying out the objects of our invention, our apparatus is represented as consisting simply of an arch or furnace, A, with a fire-place, B, at one end and a chimney, C, at the other. A pan, D, covers that portion of the arch nearest the chimney. Into this pan the fresh juice is poured and exposed to a moderate degree of heat until the impurities rise to the surface and are skimmed off. The juice is then allowed to flow into one of the pans immediately over the fire, where it is exposed to a higher degree of heat and boiled down to a proper consistency for granulation or crystallization, when it is removed from the fire and allowed to cool. In order to save time, we use two pans, so that one may be over the fire all the time. To facilitate the removal of the pans, we use two cross-bars, F, upon which the pans may be moved back and forth. These pans are usually made of large size, holding from fifty to one hundred gallons apiece. Were the pans simply laid upon flat ways and pushed aside by main force, it would require some exertion to move them, and when moved it would probably be with a sudden jerk, which would be apt to cause the hot sirup to spill over the edge of the pan and scald the workmen. This difficulty we have overcome in the following manner: Upon one of the ends of each of the cross-bars F we form rack-teeth into which spur-pinions $e$ gear. These pinions are mounted on a shaft, $e'$, running the whole length of the pan E, and turned by a handle, $e^2$. Small wheels or rollers $e^3$ are mounted in suitable bearings on each end of the pans E E', and travel on the rails F. These two pans are connected by a loose link, $e^4$, which causes them to travel together; but it can easily be removed to allow the pans to tip when required. It will thus be seen that the attendant, by turning the crank $e^2$, can cause the pans to roll gently along on their wheels with but a slight exertion of strength, and thus avoid the danger of scalding himself. The pans are provided with suitable outlets at the bottom; but it is sometimes necessary to scoop out the contents, and to do this when the pan is level is very troublesome. To obviate this objection we bend down the rails F at a sufficient angle to tilt the pan properly and form a depression in their ends, into which the outer wheels of the pan may sink, and thus incline it still more and hold it there. The details of this arrangement are clearly shown in Figs. 1 and 3 of the drawings, and we have found it a great convenience in practice.

We are aware that the use of pans sliding on horizontal ways is not new, and therefore do not broadly claim such device; but,

Having thus fully described the construction and operation of our improved evaporator, what we do claim therein as new, and desire to secure by Letters Patent, is—

1. Forming depressions $f$ in the inclined rails F, as described, for the purpose of tilting the pans and holding them in that position.

2. The combination of the racks on the rails F with the pinions on the pan E, when operating in the manner described, for the purpose set forth.

3. The combination of the pans E E', the gearing for moving them, and the inclined rails F, with the fire-place B, when the whole are constructed, arranged, and operate substantially in the manner described, for the purpose set forth.

In testimony whereof we have hereunto subscribed our names.

ORLANDO CLARKE.
ISAAC UTTER.

Witnesses:
HENRY H. PALMER,
JOHN FISHER.